July 12, 1927.
R. L. TOLSON
1,635,236
FOUR-WHEEL DRIVE TRANSMISSION FOR TRACTORS
Original Filed Feb. 2. 1921
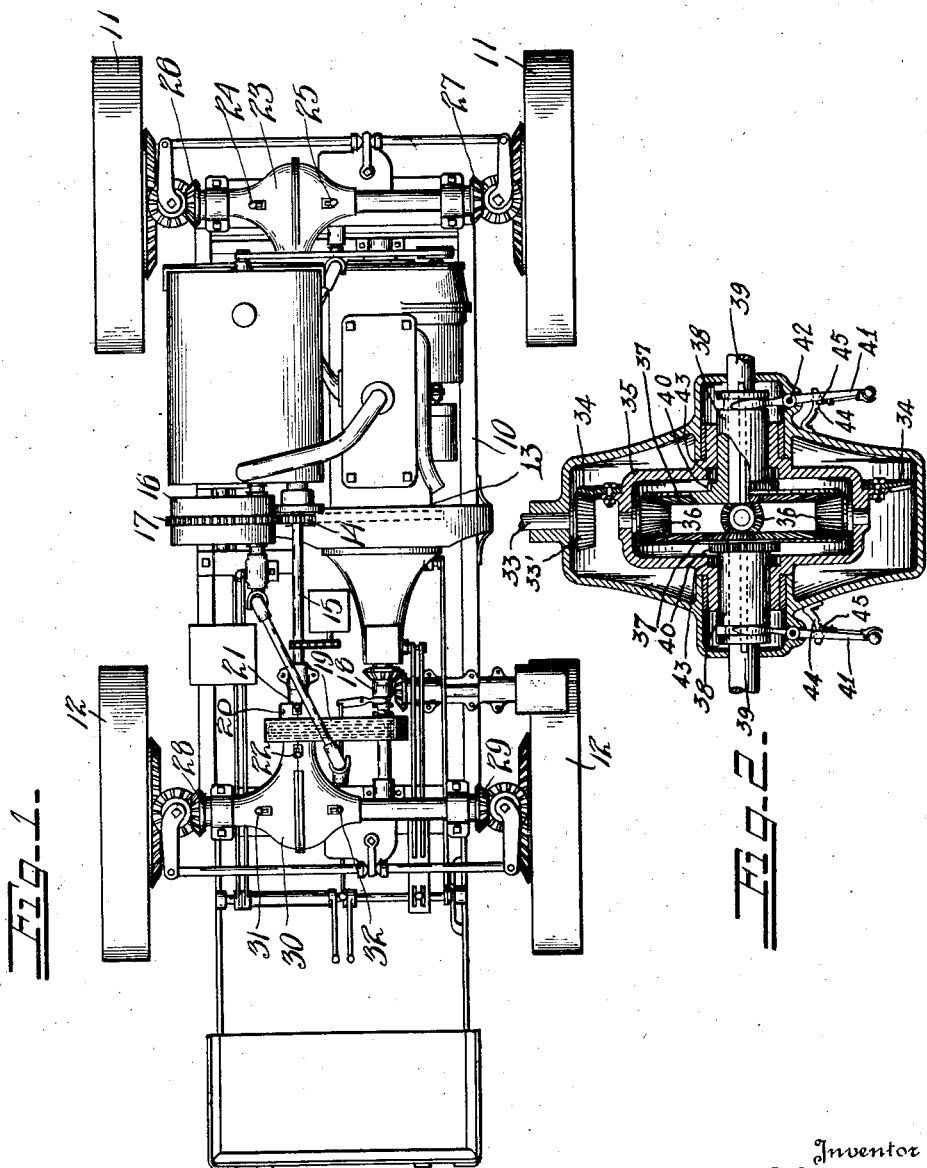
Inventor
John W. Farley,
Administrator of the Estate of
Robert L. Tolson, Deceased.
By
Attorney Patented July 12, 1927.

1,635,236

UNITED STATES PATENT OFFICE.

ROBERT L. TOLSON, DECEASED, LATE OF MEMPHIS, TENNESSEE; BY JOHN W. FARLEY, ADMINISTRATOR, OF MEMPHIS, TENNESSEE, ASSIGNOR TO JOHN W. FARLEY, TRUSTEE, OF MEMPHIS, TENNESSEE.

FOUR-WHEEL-DRIVE TRANSMISSION FOR TRACTORS.

Original application filed February 2, 1921, Serial No. 441,915. Divided and this application filed May 22, 1923. Serial No. 640,795.

This invention relates to a four wheel drive transmission and has for an object to provide a transmission for a tractor in which all four wheels may be driven, or either the front set or the rear set by itself, the other set running idly or if it becomes desirable to do so, any one wheel may be placed in or out of action by itself. This application is a division of application No. 441,915, filed February 2, 1921, now Patent No. 1,458,560, dated June 12, 1923.

Referring to the accompanying drawing which is made a part hereof and on which similar reference characters indicate similar parts, Figure 1 is a plan view of my invention.

Figure 2 is a detailed section through the differential gearing.

In the drawing reference character 10 indicates the body of a tractor having front wheels 11 and rear wheels 12. An engine on the frame has fixed to its shaft a gear 13 driving a gear 14 loose on a shaft 15 and the gear 14 drives a drum 16 by means of a ring of gear teeth 17 midway between the ends of the drum. The drum drives power operated steering mechanism for the tractor in a manner fully explained in the application above referred to.
A clutch member 18 is splined to the engine shaft rearwardly of the gear 13 and is adapted in one position to drive a sprocket engaging a chain 19 which passes over another sprocket adapted to be connected to the shaft 15 or to a rearwardly extending shaft in the transmission casing 20 in which is provided a differential which may be operated to drive the shafts connected to the differentials 23 and 30 by means of hand levers 21 and 22 respectively. The details of the transmission mechanism are like those in Patent No. 1,437,692 December 5, 1922, the arrangement being such as to drive the shafts differentially, or to drive either one positively so that according to the desire of the operator the front wheels alone may be driven while the rear wheels are idle, or the rear wheels alone may be driven while the front wheels are idle.
When the front wheels are driven it is again possible to drive both of said wheels or to drive either one positively while the other one is idle, this being due to a differential gearing in a casing 23 such differential gearing being controlled by hand levers 24 and 25 either to drive the beveled gears 26 and 27 differentially or to drive either one positively, said gears being connected to drive the respective wheels in a manner fully explained in the application above referred to.

The drive of the rear wheels is controlled in similar manner, these wheels being driven from beveled gears 28 and 29 driven by a differential gearing in the casing 30 and the drive being controlled by hand levers 31 and 32 so as either to drive the two wheels differentially or to drive either one positively as desired while the other is idle.

Referring to Figure 2, the outer differential casing is of conventional form for the usual purpose. A pinion 33' on a driving shaft 33 engages with a master gear 34 on the differential casing 35. This casing carries a series of pinions 36, 36 normally engaging gears 37, 37. Each of the gears 37, 37 has integral therewith a sleeve 38 surrounding a shaft of the divided axle 39 and splined thereto. An enlarged portion of each sleeve has gear teeth 40 formed thereon and each sleeve has also a groove engageable by a lever 41 pivoted at 42 on the gear casing and held in position by a pawl 13 and rack 14.

As shown in the drawing shaft 33, through the differential mechanism, may drive shafts 39, 39 in the usual fashion if desired. Alternately, either shaft 39 may be driven positively by actuating its lever 41 to move sleeve 38 to a position in which the teeth 40 will engage teeth 43 on the differential casing. It will be evident that when thus moved the gear 37 will be out of engagement with the pinions and will move in unison with the casing 35. Either or both gears may be thus driven positively to drive the shafts 39, 39 positively. The levers 41 are preferably held either in the position shown or in the opposite position where teeth 40 engage teeth 43, by means of a locking segment 44 having two notches for alternate engagement by a detent 45 on the lever 41.

If desired the gears 37 in the casing 35 could be so spaced as to afford an intermediate position in which neither set of teeth on a gear would be in engagement and no drive would be transmitted, a third notch being then provided on the segment 44.

The operating levers for the clutches are shown extending laterally in order to show their manner of operation although obviously, they might extend vertically as shown in Fig. 1.

It will be seen from the above description that the differential gearing enables the operator to drive both sets of wheels positively from the engine or either set positively when for example the other set is in a slippery place. Alternatively both sets may be free from the engine to permit the tractor to be pulled by propelling means other than its own power, if desired. It is also possible to drive any one wheel by itself or any two or three wheels as desired.

It will be obvious to those skilled in the art that this construction may be changed in numerous ways and therefore it is not desired to limit the invention to the specific mechanism shown in the drawings and described in the specification but only as indicated in the appended claim.

Having thus fully described said invention, what is claimed as new and desired to be secured by Letters Patent, is:

In a motor vehicle, front and rear wheels, differential gearing for the wheels of each set, a driving shaft connected to one of said sets of differential gearing and adapted to be driven from the engine, a driving shaft extending from the other set of differential gearing, means adapted to drive either or both of said shafts positively, a gear loosely mounted on the second driving shaft, a gear on the engine shaft for driving the same, and a drum driven by the first mentioned gear and adapted to drive the steering mechanism of the tractor, substantially as set forth.

In witness whereof, I have hereunto set my hand at Memphis, Tennessee, this 14th day of May, A. D. 1923.

JOHN W. FARLEY,
*Administrator of the Estate of Robert L. Tolson, Deceased.*